Feb. 10, 1931.  G. W. WATTS  1,792,134
ENTRAINMENT ARRESTER
Filed June 4, 1928   3 Sheets-Sheet 2
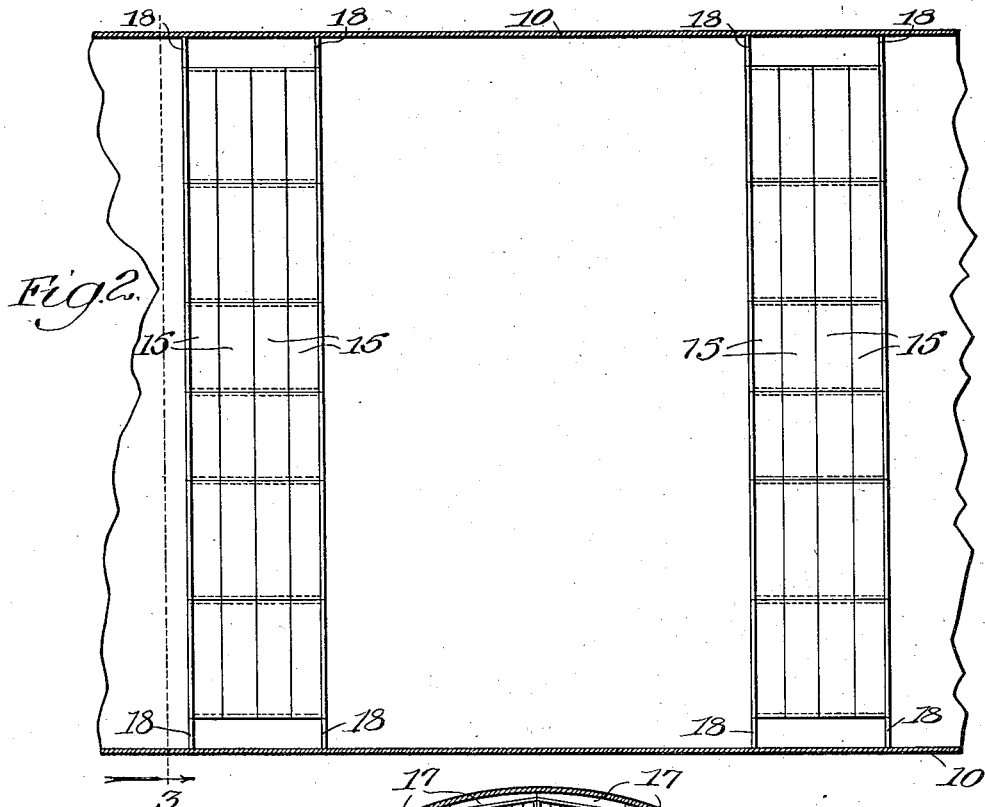
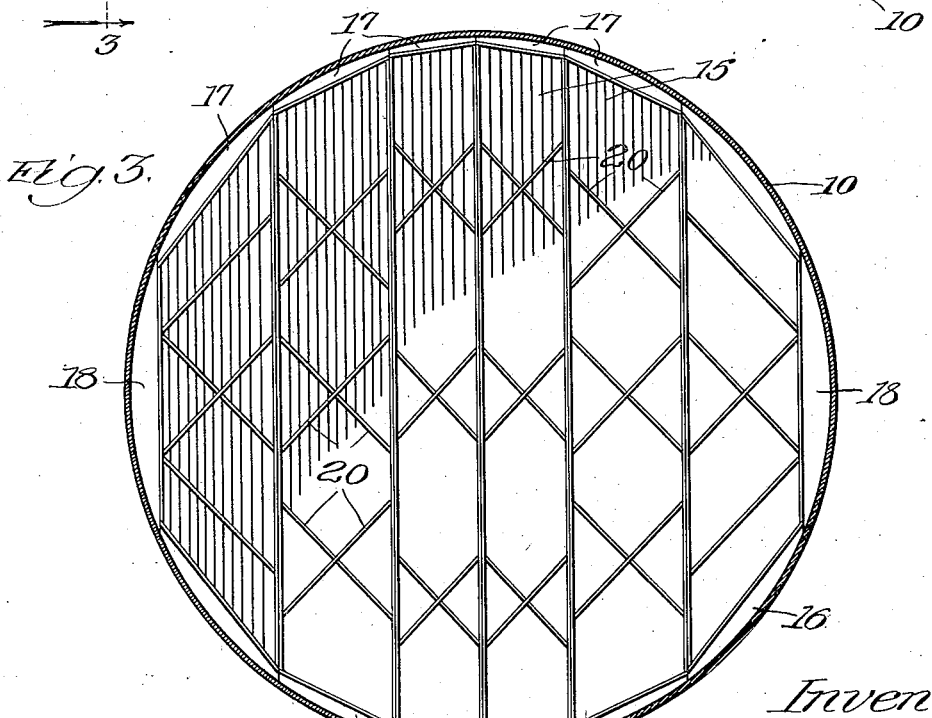
Inventor:
George W. Watts,

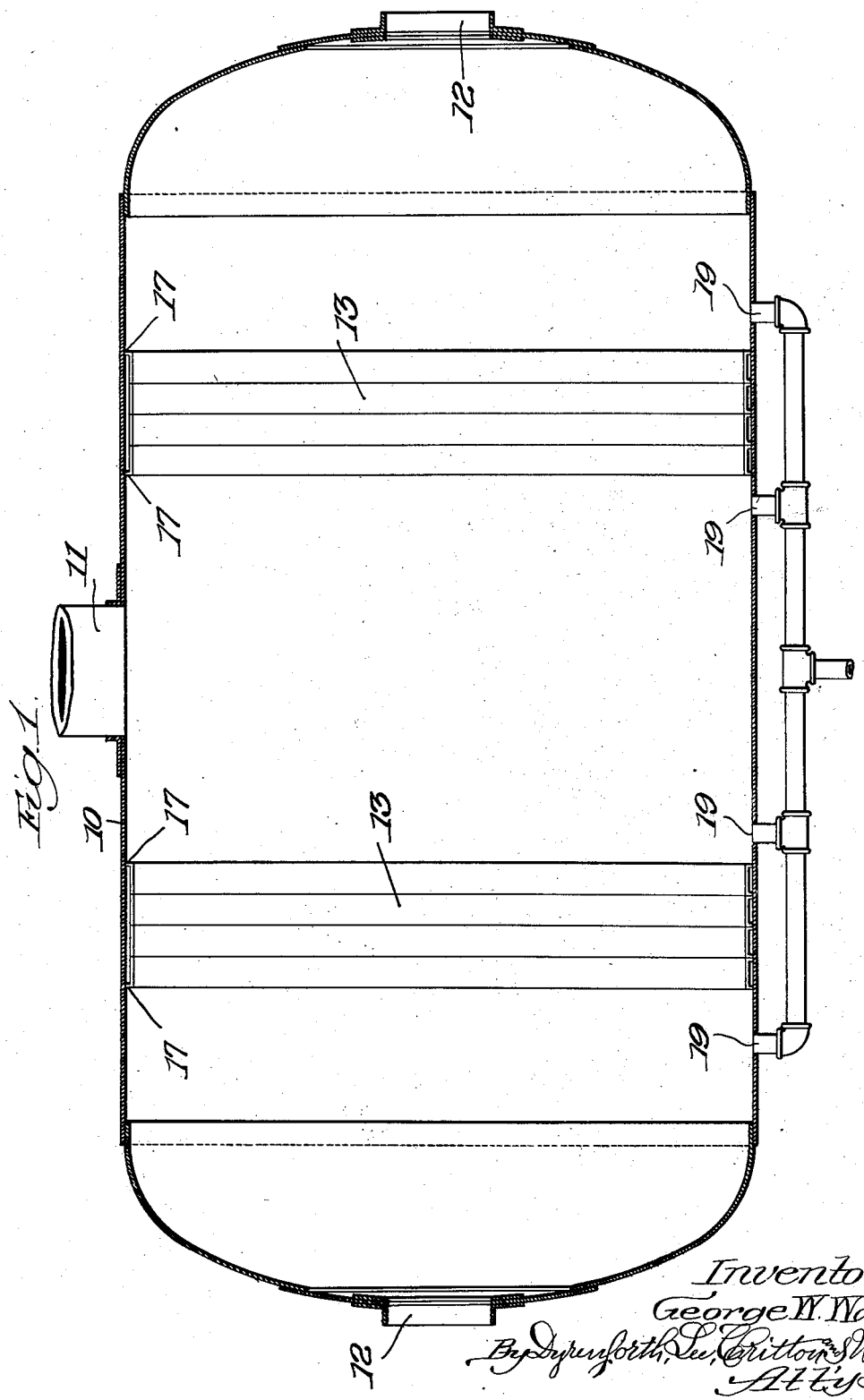

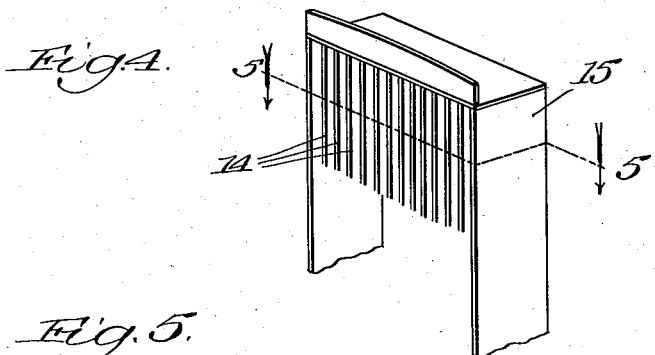
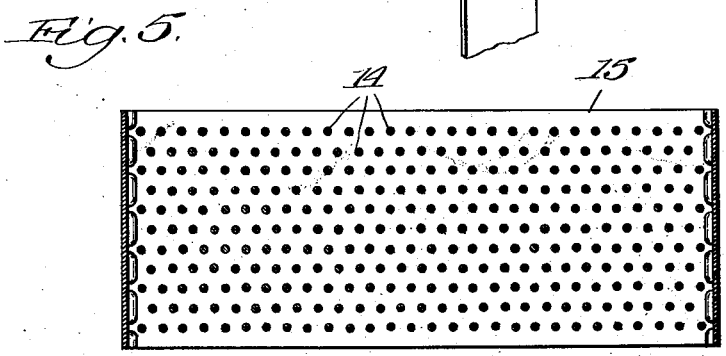
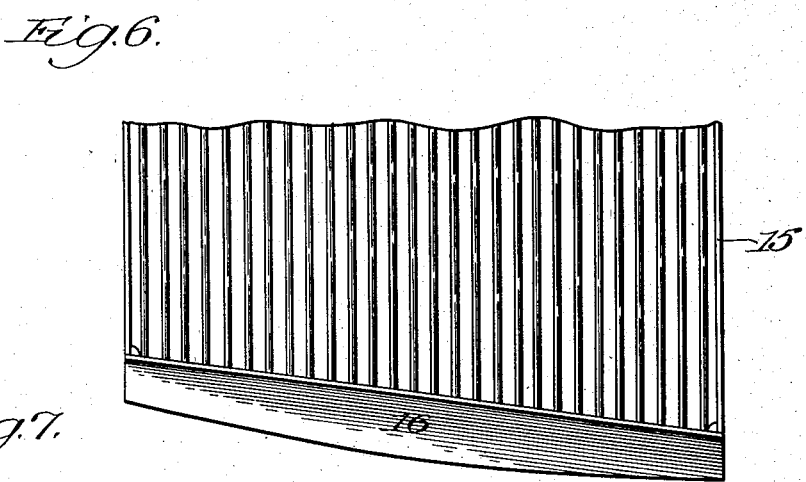
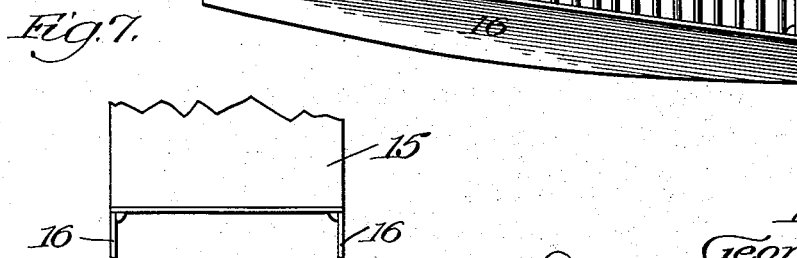

Patented Feb. 10, 1931

1,792,134

UNITED STATES PATENT OFFICE

GEORGE W. WATTS, OF WHITING, INDIANA, ASSIGNOR TO STANDARD OIL COMPANY, OF WHITING, INDIANA, A CORPORATION OF INDIANA

ENTRAINMENT ARRESTER

Application filed June 4, 1928. Serial No. 282,855.

This invention relates to entrainment arresters and will be readily understood from the following description of a preferred embodiment, taken in conjunction with the accompanying drawings, in which—

Figure 1 is a sectional elevation of a preferred embodiment of the entrainment arrester;

Fig. 2 is a partial plan view, with the upper half of the outer casing cut away;

Fig. 3 is a transverse section on the line 3 of Fig. 2;

Fig. 4 is a perspective detail of the upper end of an outer rod cell;

Fig. 5 is a sectional plan on the line 5—5 of Fig. 4;

Fig. 6 is a front elevational detail of the lower end of one of the rod cells; and Fig. 7 is a transverse elevational detail of the lower end of one of the rod cells.

Referring to the drawings, 10 is a horizontal drum provided centrally of its upper side with a vapor inlet pipe 11 and at each end with a vapor outlet pipe 12. Between the vapor inlet 11 and each of the outlet pipes 12 is located a block 13 which occupies the cross-section of the drum 10 and comprises great numbers of closely arranged vertical wires or rods 14, so that the vapors passing from the inlet 11 to either outlet 12 are compelled to pass between a considerable number of said wires. The vertical rods or wires 14 are suitably mounted in cells 15, which are preferably elongated in shape so that they may be readily passed into the drum 10 and assembled therein. The cells are so shaped that they co-operate to occupy completely the cross-section of the drum 10, as shown in Fig. 3. As shown in Fig. 2, a plurality, four being shown, of cells 15 are arranged longitudinally and a plurality, six being shown, are arranged transversely so that each block 13 comprises twenty-four cells.

Each of the cells 15 comprises a rectilineal frame, the rods 14 being attached to the upper and lower sides thereof in suitable manner, for example, by spot-welding. The cells 15 may suitably be reinforced by stays 20. At its lower end, each of the cells 15 is provided with a pair of foot plates 16, which are shaped to conform to the curvature of the drum 10.

As shown in Figs. 1 and 3, the upper ends of the outermost cells 15 of the block 13, that is, the cells which constitute the outer faces of said block, are provided on their outer sides with plates 17 which are shaped to conform to the curvature of the drum. Similar plates 18 are provided on the outer sides of the outermost shorter cells, as shown in Figs. 2 and 3. The plates 16, 17 and 18 are suitably welded to the drum 10 and the cells may be welded together so as to form a unitary block 13 which prevents passage of the vapors from the vapor inlet 11 to the vapor outlets 12, except through the maze of vertical wires or rods which said blocks present.

At its lower end, the drum 10 is provided with suitable drain pipes 19 for the removal of the separated entrained liquid.

In operation, the vapors are supplied downwardly by pipe 11 and change sharply in direction toward the outlets 12. Owing to this change of direction, a considerable proportion of the entrained liquid is thrown down toward the bottom of the drum 10. Droplets, which are not thus thrown out, impinge upon the vertical wires 14 and pass downwardly thereon to the bottom of the drum 10. It has been found that the rate of flow of vapors through the blocks 13 should be between two and six feet per second. Above six feet per second there is a tendency for some of the droplets to become broken into still smaller droplets which are then more difficult to remove.

Although the present invention has been described in connection with the specific details of a preferred embodiment thereof, it is not intended that such details shall be regarded as limitations upon the scope of the invention, except in so far as set forth in the accompanying claims.

I claim:

1. An apparatus for removing entrained liquid from vapors which comprises a chamber, a vapor inlet in its upper side, vapor outlets in opposite sides, means comprising great numbers of vertical rods located between said inlet and each of said outlets, and means for withdrawing separated entrained liquid from said chamber.

2. An apparatus for removing entrained liquid from vapors comprising a chamber, an inlet for supplying vapors to the upper side thereof, an outlet in a side of said chamber and remote from said inlet, and a block of vertical rods located between said inlet and outlet so as to occupy the cross-section of said chamber, said block comprising an assemblage of cells, each of which comprises a frame containing a large number of vertical rods.

3. An apparatus for removing entrained liquid from vapors comprising a chamber, an inlet for supplying vapors to the upper side thereof, a pair of outlets in opposite sides of said chamber and remote from said inlet, and a block of vertical rods located between said inlet and each of said outlets so as to occupy the cross-section of said chamber, each of said blocks comprising an assemblage of cells, each of which comprises a frame containing a large number of rods.

4. An apparatus for removing entrained liquid from vapors comprising a chamber through which said vapors are adapted to pass, and a block of vertical rods of small cross-section occupying the cross-section of said chamber, said block comprising a number of adjacent frames attached together and to the walls of said chamber, each of said frames containing a large number of the said small vertical rods.

In testimony whereof, I have hereunto set my hand this 30th day of April, 1928.

GEORGE W. WATTS.